(12) United States Patent
Borichevsky et al.

(10) Patent No.: US 9,068,657 B2
(45) Date of Patent: Jun. 30, 2015

(54) GATE VALVE WITH IMPROVED SEAL ARRANGEMENT

(71) Applicants: Steven C. Borichevsky, Gloucester, MA (US); Robert H. Bettencourt, Gloucester, MA (US)

(72) Inventors: Steven C. Borichevsky, Gloucester, MA (US); Robert H. Bettencourt, Gloucester, MA (US)

(73) Assignee: VARIAN SEMICONDUCTOR EQUIPMENT ASSOCIATES, INC., Gloucester, MA (US)

( * ) Notice: Subject to any disclaimer, the term of this patent is extended or adjusted under 35 U.S.C. 154(b) by 200 days.

(21) Appl. No.: 13/655,902

(22) Filed: Oct. 19, 2012

(65) Prior Publication Data
US 2014/0110619 A1 Apr. 24, 2014

(51) Int. Cl.
*F16K 3/02* (2006.01)
*F16K 51/02* (2006.01)

(52) U.S. Cl.
CPC ............... *F16K 3/02* (2013.01); *F16K 3/0227* (2013.01); *F16K 51/02* (2013.01); *F16K 3/0218* (2013.01)

(58) Field of Classification Search
CPC ....... F16K 3/02; F16K 3/0218; F16K 3/0227; F16K 3/312; F16K 51/02
USPC .............. 251/326, 328, 329, 333; 250/492.21
See application file for complete search history.

(56) References Cited

U.S. PATENT DOCUMENTS

| | | | | | |
|---|---|---|---|---|---|
| 2,242,467 | A | * | 5/1941 | Hamer | 138/94.3 |
| 2,339,970 | A | * | 1/1944 | Young | 138/94.3 |
| 2,354,967 | A | * | 8/1944 | Perry | 138/94.3 |
| 2,462,493 | A | * | 2/1949 | Hamer | 138/44 |
| 2,499,382 | A | * | 3/1950 | Hamer | 137/560 |
| 2,499,383 | A | * | 3/1950 | Hamer | 137/560 |
| 2,815,771 | A | * | 12/1957 | Gibbs | 138/94.3 |
| 2,986,367 | A | * | 5/1961 | Le Rouax | 251/1.3 |
| 3,212,036 | A | * | 10/1965 | Skarpaas | 333/252 |
| 3,695,299 | A | * | 10/1972 | Rodgers | 138/94.3 |
| 3,936,031 | A | * | 2/1976 | Berman et al. | 251/284 |
| 4,331,268 | A | * | 5/1982 | Chisholm | 222/361 |
| 5,379,984 | A | | 1/1995 | Coad et al. | |
| 6,448,567 | B1 | | 9/2002 | Botelho et al. | |
| 7,017,886 | B1 | * | 3/2006 | Ngene-Igwe | 251/326 |
| 8,733,734 | B2 | * | 5/2014 | Nakamura et al. | 251/204 |
| 2005/0167630 | A1 | * | 8/2005 | Kammerer et al. | 251/328 |
| 2009/0114813 | A1 | * | 5/2009 | Koo et al. | 250/287 |
| 2012/0168662 | A1 | | 7/2012 | Borichevsky | |

FOREIGN PATENT DOCUMENTS

GB 835182 * 5/1960
WO WO 2011027861 A1 * 3/2011

* cited by examiner

*Primary Examiner* — Marina Tietjen

(57) ABSTRACT

A valve includes a gate and an actuator. The gate has a gate opening with a first seal fixed to the gate and positioned along a periphery of the gate opening. The gate also has a blocking portion with a second seal fixed to the gate and positioned along a periphery of the blocking portion. The actuator is configured to move the gate between an open position and a closed position, wherein the gate opening is aligned to a chamber opening in a chamber wall and the first seal engages a sealing surface of the chamber wall in the open position and wherein the blocking portion is aligned to the opening in the chamber wall and the second seal engages the sealing surface of the chamber wall in the closed position. The valve is capable of operating in harsh environments.

19 Claims, 4 Drawing Sheets

GATE VALVE WITH IMPROVED SEAL ARRANGEMENT

FIELD

This disclosure relates to valves, and more particularly to a valve suitable for harsh environments.

BACKGROUND

Valves are used in various environments such as vacuum and fluid environments to isolate two regions from one another. Valves may also be used to control the flow of fluids and substances, and in some cases, harmful or corrosive substances from one region to another. Valves may be used in various types of processing systems such as in semiconductor fabrication processing where a vacuum condition facilitates treatment of a workpiece. One type of semiconductor fabrication processing occurs in an ion implanter that generates an ion beam to treat a workpiece such as a semiconductor wafer. Such ion implanters have different chambers to generate and control the ion beam and a valve may be used to connect various vacuum chambers within the ion implanter.

A valve may be positioned between an ion source and a downstream chamber of an ion implanter such as a mass analysis chamber. The valve facilitates maintenance or changing of the ion source, since other portions of the ion implanter may be maintained under high vacuum conditions while the ion source may be vented to atmospheric conditions. Once the ion source has been maintained or changed, the valve may be reopened to allow an ion beam extracted from the ion source to pass there through. However, when the valve is open, deposits and debris originating from the ion source may form on components of the valve such as the gate causing damage to an extent that the valve cannot properly seal the ion source from other portions of the ion implanter.

One conventional apparatus for protecting the valve requires enough physical space between each region such as the ion source and a downstream mass analysis region for a valve body to be positioned. During a closed position, the gate for the valve is positioned in the valve body. During an open position, the gate is retracted into a housing having a cover that then closes to protect the gate. Although this is effective for protecting the gate from harmful deposition, this type of valve protection is ineffective in protecting the sealing surface of the valve and requires physical space between two regions that may not be available. In addition, it also requires additional components and costs for the protective gate housing and cover.

Accordingly, there is a need in the art for a valve that overcomes the above-described inadequacies and shortcomings.

SUMMARY

According to a one aspect of the disclosure, a valve is provided. The valve includes a gate and an actuator. The gate has a gate opening with a first seal fixed to the gate and positioned along a periphery of the gate opening. The gate also has a blocking portion with a second seal fixed to the gate and positioned along a periphery of the blocking portion. The actuator is configured to move the gate between an open position and a closed position, wherein the gate opening is aligned to a chamber opening in a chamber wall and the first seal engages a sealing surface of the chamber wall in the open position and wherein the blocking portion is aligned to the chamber opening and the second seal engages the sealing surface of the chamber wall in the closed position.

According to another aspect of the disclosure, a method of operating a valve is provided. The method includes moving a gate having a gate opening with a first seal fixed to the gate and positioned along a periphery of the gate opening to an open position where the gate opening is aligned to a chamber opening in a chamber wall and the first seal engages a sealing surface of the chamber wall, and moving the gate to a closed position, the gate also having a blocking portion with a second seal fixed to the gate and positioned along a periphery of the blocking portion, where the blocking portion is aligned to the chamber opening and the second seal engages the sealing surface of the chamber wall.

According to yet another aspect of the disclosure, an ion implanter is provided. The ion implanter includes: a first chamber housing defining a first chamber, the first chamber housing having a chamber wall defining a first aperture; a second chamber housing defining a second chamber, the second chamber coupled to the first chamber; a vacuum pumping system configured to maintain the first chamber and the second chamber at a vacuum condition; a gate positioned in the second chamber, the gate having a gate opening with a first seal fixed to the gate and positioned along a periphery of the gate opening, the gate also having a blocking portion with a second seal fixed to the gate and positioned along a periphery of the blocking portion; and an actuator. The actuator is configured to move the gate between an open position and a closed position, wherein the gate opening is aligned to the aperture and the first seal engages a sealing surface of the chamber wall in the open position and wherein the blocking portion is aligned to the opening in the chamber wall and the second seal engages the sealing surface of the chamber wall in the closed position.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
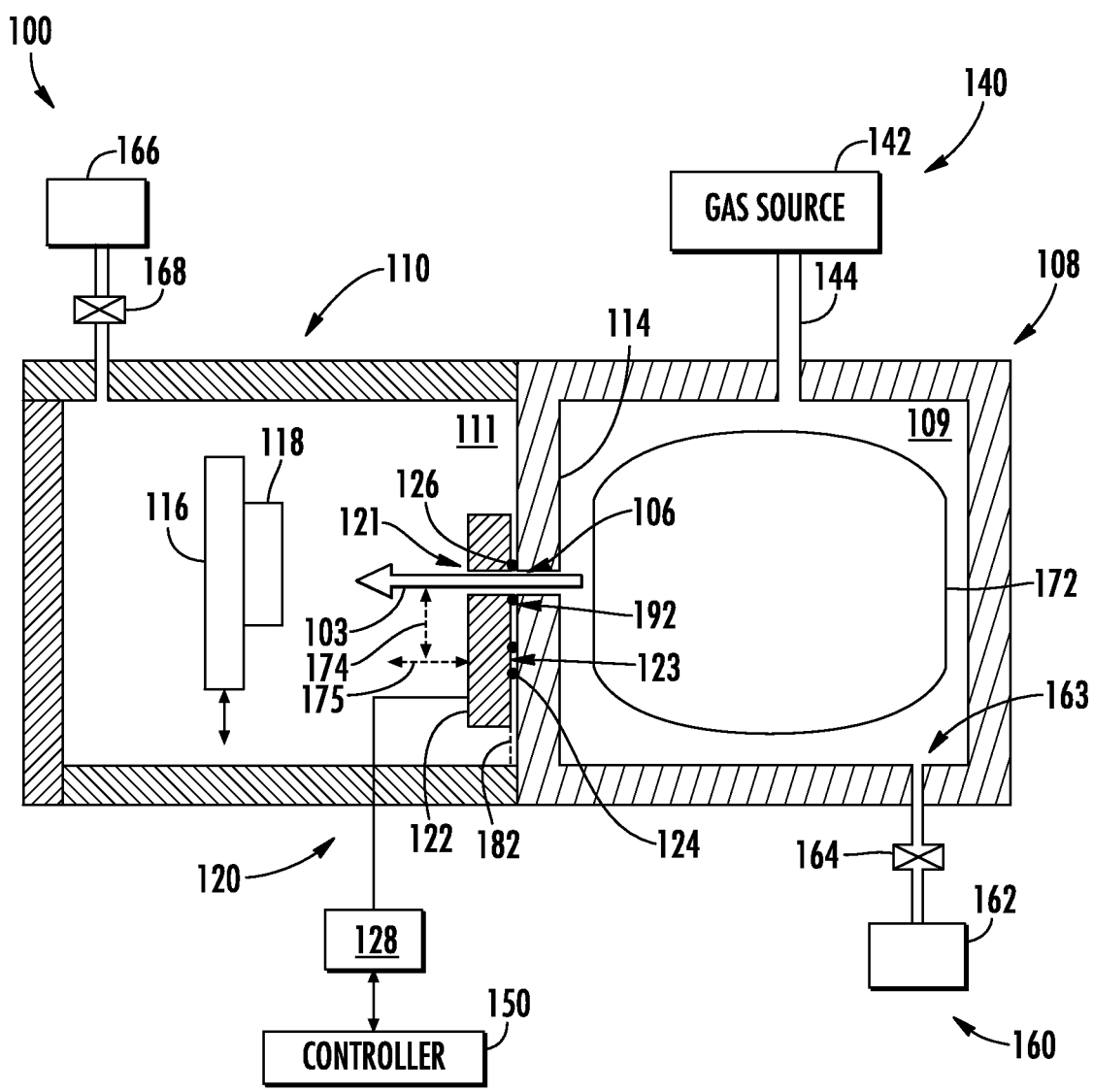
FIG. 1 is a block diagram of an ion implanter having a valve consistent with the present disclosure.

The present invention will now be described more fully hereinafter with reference to the accompanying drawings, in which embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Turning to FIG. 1, a block diagram of an ion implanter 100 having a valve 120 consistent with the present disclosure is illustrated. The ion implanter 100 includes an arc chamber housing 108 defining an arc chamber 109 of an ion source. The ion implanter 100 also includes a processing chamber housing 110 defining a processing chamber 111. Although the valve 120 is described with relation to the arc chamber 109 and the processing chamber 111 of the ion implanter 100, the valve 120 may be positioned between any two chambers of an ion implanter. In addition, the valve 120 may be used in other vacuum processing equipment. Furthermore, the valve 120 may be used in fluid processing equipment to control the flow of fluid between two chambers. The valve 120 may also be used to isolate two chambers where a chemical etch takes place in at least one of the chambers with the chambers isolated from each other.

The ion implanter 100 also includes a gas supply system 140, a vacuum pumping system 160, and a controller 150. A platen 116 to support and move a workpiece 118 is positioned in the processing chamber 111. The workpiece 118 may include, but not be limited to, a solar cell, a semiconductor wafer, a flat panel, and a polymer substrate. The solar cell may be a selective emitter solar cell, interdigitated solar cell, or other type. The semiconductor wafer may have a disk shape with a diameter of 300 millimeters (mm).

The gas supply system 140 may include a gas source 142 to provide one or more different process gases to the arc chamber 109 via a conduit 144. The vacuum pumping system 160 establishes a desired pressure in the arc chamber 109 and the processing chamber 111. The vacuum pumping system 160 may include at least one vacuum pump 162 to evacuate the arc chamber 109 through a vacuum port 163. A vacuum valve 164 controls vacuum conductance through the vacuum port 163. The vacuum pumping system 160 may also include another vacuum pump 166 and vacuum valve 168 to maintain a desired pressure in the processing chamber 111.

The valve 120 includes an actuator 128 and a gate 122. The actuator 128 may be an electromechanical actuator having a motor, gear train, and linkage to control movement and positioning of the gate 122. The actuator 128 may be responsive to control signals from a controller 150. The gate 122 has a gate opening 121 with a first seal 126 fixed to the gate 122 and positioned along a periphery of the gate opening 121. The gate 122 also has a blocking portion 123 with a second seal 124 fixed to the gate 122 and positioned along a periphery of the blocking portion 122.

The controller 150 can be or include a general-purpose computer or network of general-purpose computers that may be programmed to perform desired input/output functions. The controller 150 can also include other electronic circuitry or components, such as application specific integrated circuits, other hardwired or programmable electronic devices, discrete element circuits, etc. The controller 150 may also include communication devices, data storage devices, and software. The controller 150 may receive input signals from a variety of systems and components of the ion implanter 100 to determine a condition of one or more systems and components and also to control the same. For example, the controller 150 may control the valve 120, the vacuum pumping system 160, and the gas supply system 140. If the actuator 128 is a pneumatic actuator, the controller 150 may also drive a pneumatic interface to facilitate operation of the pneumatic actuator.

In operation, the gas source 142 supplies a process gas to the arc chamber 109. The ion source generates plasma 172 in the arc chamber 109 by ionizing the process gas. The ion source may be any type of ion source such as an RF ion source or an indirectly heated cathode ion source to generate plasma 172. An ion beam 103 is extracted through an extraction aperture 106 of the extraction plate 114 of the ion source. The ion beam 103 may be extracted through known biasing techniques such as an extraction electrode assembly (not illustrated) positioned downstream from the gate 122. The platen 116 holds and drives the workpiece 118 past the ion beam 103. The vacuum pumping system 160 may maintain the pressure within the arc chamber 109 and the processing chamber 111 at a vacuum condition. In one instance, the vacuum condition may be a pressure less or equal to 10 mTorr.

The actuator 128 of the valve 120 positions the gate 122 in one of two positions. In an open position as illustrated in FIG. 1, the gate opening 121 is aligned to the extraction aperture 106 of the extraction plate 114. The first seal 126 engages a sealing surface 192 of the extraction plate 114 about the extraction aperture 106. The sealing surface 192 may be machined to a smooth surface compared to the remainder of the extraction plate 114 and surround an entirety of the extraction aperture 106. In this open position, the gate opening 121 permits passage of the ion beam 103. In addition, the first seal 126 protects the sealing surface 192 of the extraction plate 114 in this open position from deposits and debris. The second seal 124 and the blocking portion 123 are also protected by pressing the second seal 124 against the extraction plate 114. For example, if the dopant gas is $BF_3$, the sealing surface 192, the second seal 124, and the blocking portion 123 are protected by limiting boron deposits that may otherwise form on them and degrade operation of the valve.

The actuator 128 may also position the gate 122 in a closed position. In the closed position, the blocking portion 123 is aligned to the extraction aperture 106 of the extraction plate 114 and the second seal 124 is positioned where the first seal 126 was previously positioned. The actuator 128 may drive the gate 122 in a direction 175 orthogonal to a plane 182 defined by the blocking portion 123 of the gate 122. The actuator may also drive the gate in a direction 174 parallel to the plane 182 to reposition the gate between the open position and closed position. Other directions of movement are also possible. The actuator 128 may also provide enough force in the direction 175 to press the gate 122 against the extraction plate 114 when in the open position or closed position. The sealing surface 192 may also provide further protection for the first seal 126 and second seal 124 when pressed toward the extraction plate 114 to contact the sealing surface 192. In the embodiment of FIG. 1, all portions of the gate 122 may be disposed within the processing chamber 111 whether the gate 122 is in the open position or closed position. In other embodiments, a portion of the gate may be disposed in a side volume of a side compartment depending on factors such as the size of the chamber and the gate.

Figure 2:
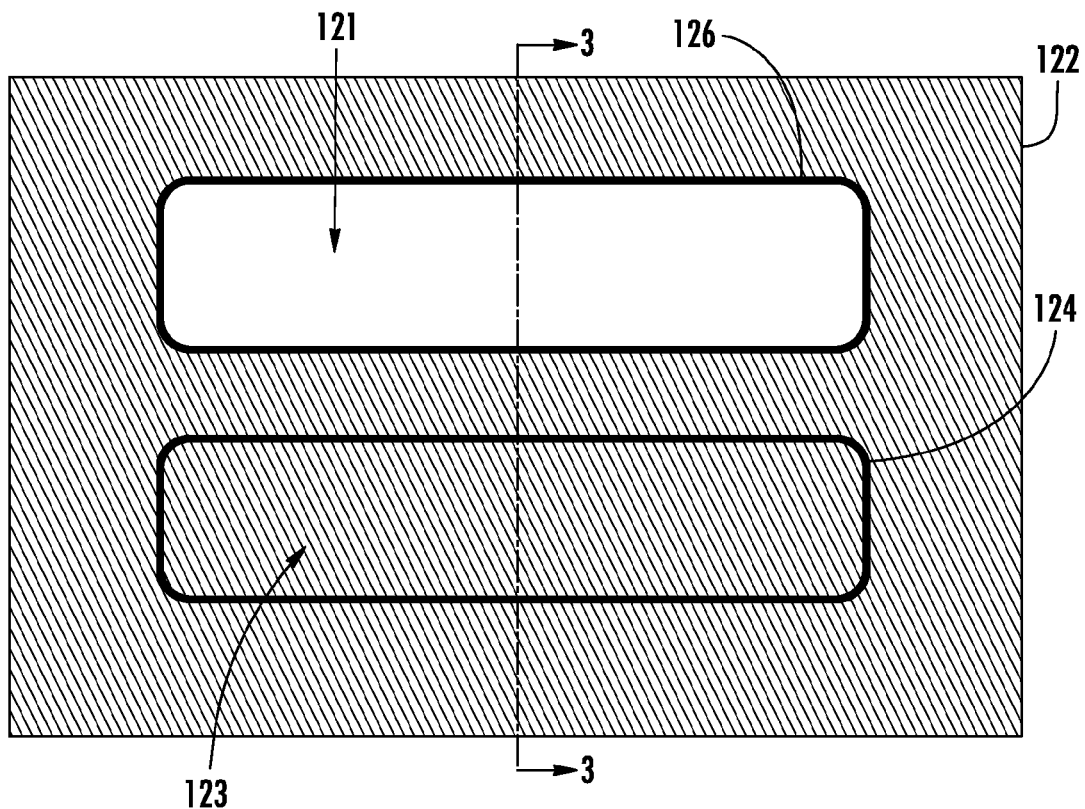
FIG. 2 is a plan view of a gate of a valve consistent with the present disclosure.
Figure 3:
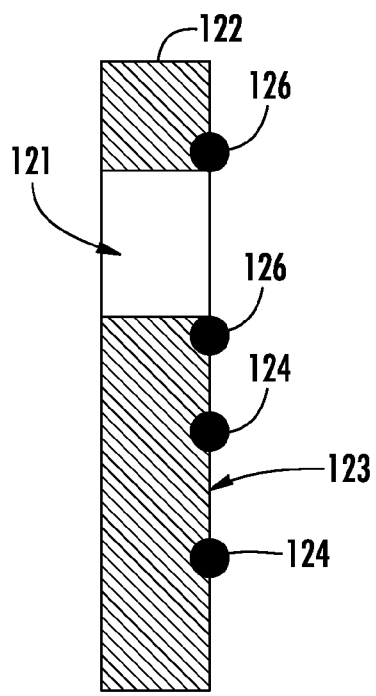
FIG. 3 is a cross sectional view of the gate of FIG. 2 taken along the line 3-3 of FIG. 2.

Turning to FIG. 2, a plan view of the gate 122 of FIG. 1 is illustrated more clearly showing the gate opening 121 and blocking portion 123 of the gate 122. FIG. 3 is a cross sectional view of the gate 122 of FIG. 2 taken along the line 3-3 of FIG. 2. The first seal 126 is fixed to the gate 122 and positioned along a periphery of the gate opening 121. The second seal 124 is fixed to the gate 122 and positioned along a periphery of the blocking portion 123. The gate 122 may be fabricated of ion beam blocking materials such as stainless steel or silicon coated aluminum. The first seal 126 and second seal 124 may be a deformable body of elastomeric material such as natural rubber or other suitable synthetic elastomer. The first seal 126 and second seal 124 may also be fabricated of metal suitable for ultra-high vacuum applications. The particular heat resistance and resistance to chemicals of these materials may be selected based on the particular application. The gate opening 121 defines an opening area and the blocking portion defines a blocking area that may be equal to the opening area. The gate opening 121 and blocking portion 123 may have a rectangular shape to accommodate passage of an ion beam having an elongated cross sectional shape sometimes referred to as a "ribbon beam." The rectangular shape may also be wide enough to be used as a "pass-through" valve where workpieces may be transferred form one chamber to another through the gate opening 121. The gate opening 121 may also have an oval shape to accommodate passage of an ion beam having an approximately circular cross sectional shape sometimes referred to as a "spot beam."

Figure 4:
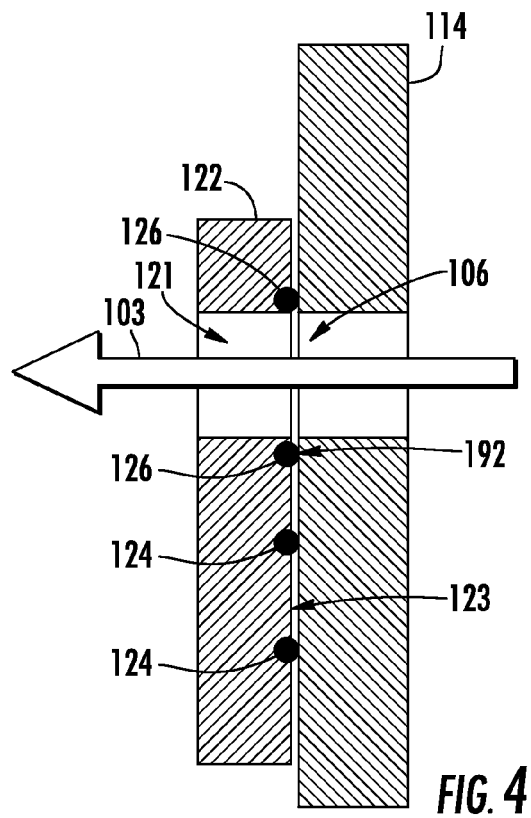
FIG. 4 is a cross sectional view of the gate of FIG. 2 and an associated chamber wall with the gate positioned in an open position.

Turning to FIG. 4, a cross sectional view of the gate of FIG. 2 as well as a section of the extraction plate 114 defining an extraction aperture 106 is illustrated with the gate 122 in an open position. Although described with reference to the extraction plate 114 and extraction aperture 106, the gate 122 may be used with a different chamber wall and chamber opening in the chamber wall in a consistent manner. In the open position of FIG. 4, the gate opening 121 is aligned to the extraction aperture 106 of the extraction plate 114 to permit passage of the ion beam 103. The first seal 126 engages the sealing surface 192 of the extraction plate 114 about the extraction aperture 106. Advantageously, in this open position the first seal 126 protects the sealing surface 192 of the extraction plate 114 proximate the extraction aperture 106 from deposits and debris while in this open position, and the second seal 124 is protected by being sealed against the extraction plate 114.

Figure 5:
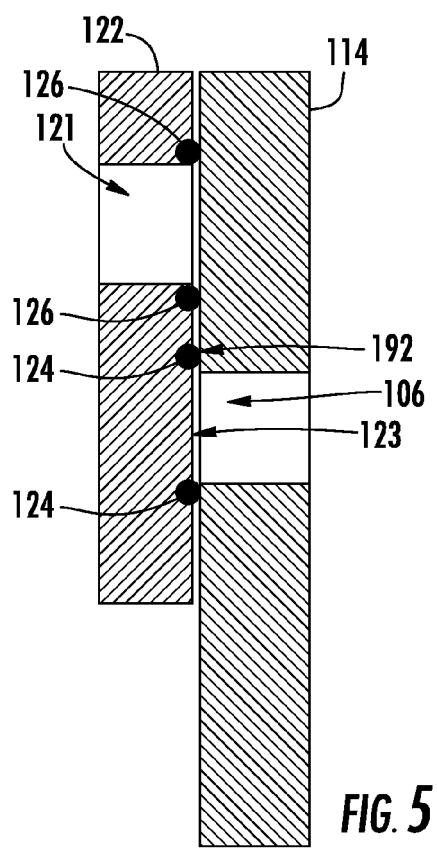
FIG. 5 is a cross sectional view of the gate of FIG. 2 and an associated chamber wall with the gate positioned in a closed position.

Turning to FIG. 5, the similar cross sectional view of FIG. 4 is illustrated with the gate 122 in a closed position. In this closed position, the blocking portion 123 is aligned to the extraction aperture 106 of the extraction plate 114 to isolate the arc chamber 103 from a downstream chamber. The second seal 124 engages the sealing surface 192 of the extraction plate 114 about the extraction aperture 106. Advantageously, the second seal 124 protects the sealing surface 192 from deposits and debris in the closed position and the first seal 126 is protected by being sealed against the extraction plate 114.

Figure 6:
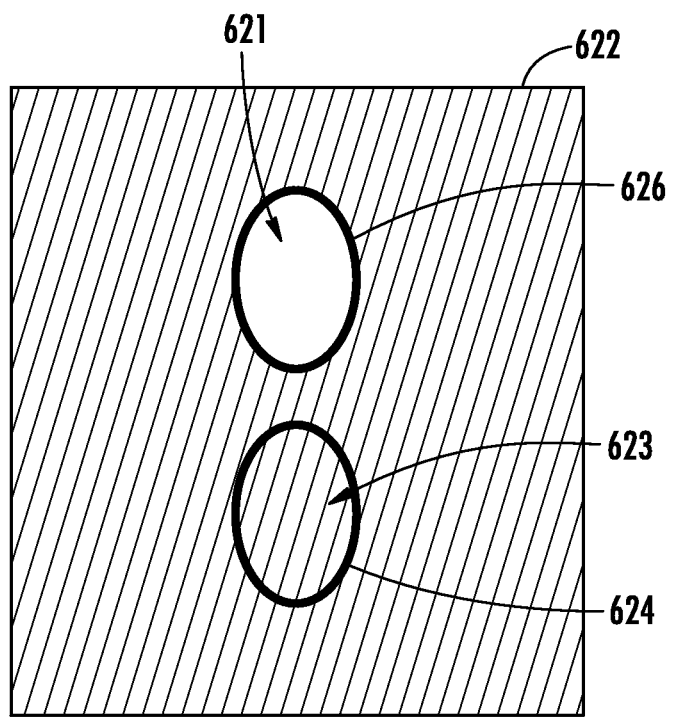
FIG. 6 is a plan view of another embodiment of a gate of a valve consistent with the present disclosure.

Turning to FIG. 6, a plan view of another embodiment of a gate 622 consistent with the disclosure is illustrated. The gate 622 includes a gate opening 621 and a blocking portion 623 both having an oval shape. The gate opening 621 may facilitate passage of a spot beam there through. A first seal 626 is fixed to the gate 622 and positioned along a periphery of the circular gate opening 621. A second seal 624 is fixed to the gate 622 and positioned along a periphery of the blocking portion 623. In operation, the gate 622 may be positioned in an open position and a closed position similarly to that previously detailed with the gate 122 to accommodate passage of a spot beam in the open position.

Accordingly, there has been provided a valve having a gate and an actuator. The gate has a gate opening with a first seal fixed to the gate and positioned along a periphery of the gate opening. The gate also has a blocking portion with a second seal fixed to the gate and positioned along a periphery of the blocking portion. The actuator is configured to move the gate between an open position and a closed position, wherein the gate opening is aligned to a chamber opening in a chamber wall and the first seal engages a sealing surface of the chamber wall in the open position and wherein the blocking portion is aligned to the opening in the chamber wall and the second seal engages the sealing surface of the chamber wall in the closed position.

Advantageously, the valve may be positioned in a processing tool with limited physical space between chambers. No separate vacuum body between chambers is necessary to accommodate the gate. During the open position, the first seal protects the sealing surface from deposits and debris. Also during the open position, the second seal and the blocking portion is protected from deposits and debris by pressing the second seal against a chamber wall. During the closed position, the second seal protects the sealing surface from deposits and debris. Also during the closed position, the first seal is protected by pressing the first seal against the chamber wall. Accordingly, the valve is capable of operating under harsh conditions with a longer life time and minimized downtime for maintenance.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. An ion implanter comprising:
a chamber housing defining an arc chamber, the chamber housing having an extraction plate defining an extraction aperture;
a valve comprising:
a gate having a gate opening with a first seal fixed to the gate and positioned along a periphery of the gate opening, the gate also having a blocking portion with a second seal, separate from the first seal, fixed to the gate and positioned along a periphery of the blocking portion; and
an actuator configured to move the gate between an open position and a closed position, wherein the gate opening is aligned to the extraction aperture and the first seal engages a sealing surface of the extraction plate in the open position and wherein the blocking portion is aligned to the extraction aperture and the second seal engages the sealing surface of the extraction plate in the closed position;
wherein the gate opening defines an opening area and the blocking portion defines a blocking area equal to the opening area, such that the first seal and the second seal have the same shape.

2. The valve of claim 1, wherein the second seal is protected from deposits by being pressed against the extraction plate when the gate is in the open position.

3. The valve of claim 1, wherein the first seal is protected from deposits by being pressed against the extraction plate when the gate is in the closed position.

4. The valve of claim 1, wherein the gate opening has a rectangular shape to accommodate passage of an ion beam having an elongated cross sectional shape.

5. The valve of claim 1, wherein the gate opening has a shape to accommodate passage of an ion beam having an approximately circular cross sectional shape.

6. A method of operating a valve in an ion implanter, the ion implanter comprising a first chamber housing defining a first chamber, the first chamber housing having a chamber wall defining an aperture and a second chamber housing defining a second chamber, the second chamber coupled to the first chamber, wherein the chamber wall separates the first chamber from the second chamber, the method comprising:

moving a gate having a gate opening with a first seal fixed to the gate and positioned along a periphery of the gate opening to an open position where the gate opening is aligned to the aperture in the chamber wall and the first seal engages a sealing surface of the chamber wall; and moving the gate to a closed position, the gate also having a blocking portion with a second seal fixed to the gate and positioned along a periphery of the blocking portion, where the blocking portion is aligned to the aperture and the second seal engages the sealing surface of the chamber wall.

7. The method of claim 6, further comprising protecting the second seal from deposits by pressing the second seal against the chamber wall when the gate is in the open position.

8. The method of claim 6, further comprising protecting the first seal from deposits by pressing the first seal against the chamber wall when the gate is in the closed position.

9. The method of claim 6, wherein the first chamber is an arc chamber of an ion source, the chamber wall is an extraction plate of the ion source, and the aperture is an extraction aperture through which an ion beam is extracted.

10. The method of claim 9, wherein the second chamber is a processing chamber having a platen configured to hold and move a workpiece past the ion beam extracted from the extraction aperture.

11. The method of claim 9, wherein the ion beam has an elongated cross sectional shape and the gate opening has a rectangular shape to accommodate passage of the ion beam.

12. An ion implanter comprising:
a first chamber housing defining a first chamber, the first chamber housing having a chamber wall defining an aperture;
a second chamber housing defining a second chamber, the second chamber coupled to the first chamber, wherein the chamber wall separates the first chamber from the second chamber;
a vacuum pumping system configured to maintain the first chamber and the second chamber at a vacuum condition;
a gate positioned in the second chamber, the gate having a gate opening with a first seal fixed to the gate and positioned along a periphery of the gate opening, the gate also having a blocking portion with a second seal fixed to the gate and positioned along a periphery of the blocking portion; and
an actuator configured to move the gate between an open position and a closed position, wherein the gate opening is aligned to the aperture and the first seal engages a sealing surface of the chamber wall in the open position and wherein the blocking portion is aligned to the aperture in the chamber wall and the second seal engages the sealing surface of the chamber wall in the closed position.

13. The ion implanter of claim 12, wherein the first chamber is an arc chamber of an ion source, the chamber wall is an extraction plate of the ion source, and the aperture is an extraction aperture through which an ion beam is extracted.

14. The ion implanter of claim 13, wherein the second chamber is a processing chamber having a platen configured to hold and move a workpiece past the ion beam extracted from the extraction aperture.

15. The ion implanter of claim 14, wherein the gate opening defines an opening area and the blocking portion defines a blocking area equal to the opening area.

16. The ion implanter of claim 14, wherein the second seal is protected from deposits by being pressed against the extraction plate when the gate is in the open position.

17. The ion implanter of claim 14, wherein the first seal is protected from deposits by being pressed against the extraction plate when the gate is in the closed position.

18. The ion implanter of claim 14, wherein the ion beam has an elongated cross sectional shape and the gate opening has a rectangular shape to accommodate passage of the ion beam.

19. The ion implanter of claim 12, wherein the first seal is separate from the second seal.

\* \* \* \* \*